Oct. 11, 1938.                K. E. BEMIS                 2,132,374

HOT CAKE SERVER

Filed June 1, 1937

Inventor
Kenneth E. Bemis
per Philip A. Friedell
Attorney

Patented Oct. 11, 1938

2,132,374

UNITED STATES PATENT OFFICE 2,132,374

HOT CAKE SERVER

Kenneth E. Bemis, Oakland, Calif.

Application June 1, 1937, Serial No. 145,757

5 Claims. (Cl. 65—15)

This invention, a hot cake server, is primarily intended for serving hot cakes. However a dish of universal application is provided thereby for serving either hot or cold foods, usually referred to as cold plates or salads, and also for serving foods in the ordinary manner without heating or cooling means.

The objects and advantages of the invention are as follows:

First; to provide a hot cake server which provides a complete and aesthetically displayed hot cake service, including hot cakes displayed in generous service appearing form, syrup and butter.

Second; to provide a server as outlined with a special type of syrup pitcher which can be supported in upright position only when placed in a special support provided in the server therefor.

Third; to provide a hot cake server which is substantially elliptical in form and having top and sides while being bottomless, with the hot cake receiving recess and the butter and syrup receptacle openings formed in the top, and with the openings and recess substantially coextensive with the top, and with the sides formed perpendicular and imperforate and of a height equal to three or four times the depth of the recess to provide the effect of a completely filled dish of considerable depth.

Fourth; to provide a container for hot or cold water or crushed ice which fits within the server from beneath and completely concealed within the server, and removably secured therein, so that the server may be served with or without the container at will.

Other objects and advantages of the invention will become apparent as the following description is read on the drawing forming a part of this specification, and in which similar reference characters are used to designate similar parts throughout the several views, of which:

Figure 1:
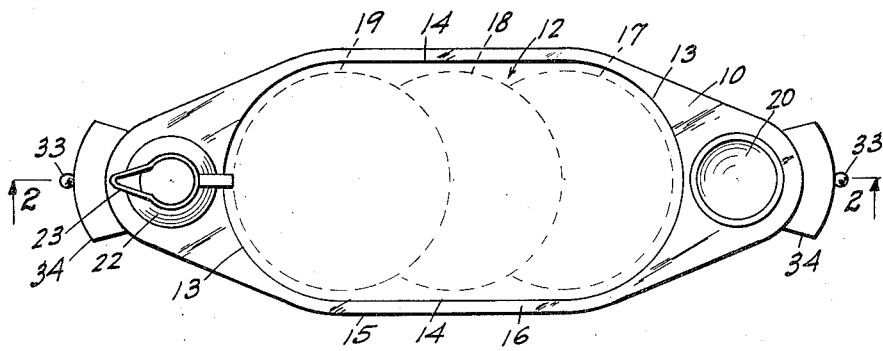
Fig. 1 is a plan view of the invention.
Figure 2:
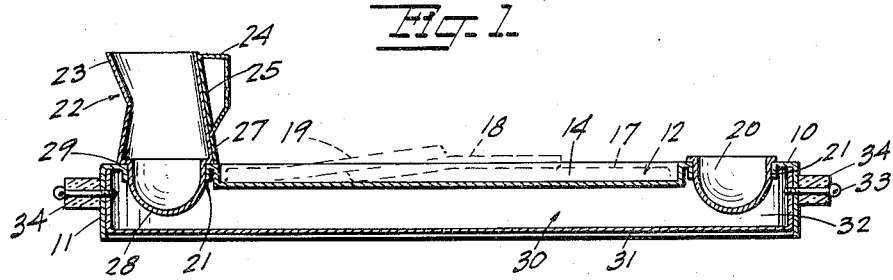
Fig. 2 is a section taken on line 2—2 of Fig. 1.
Figure 3:
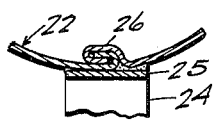
Fig. 3 is an enlarged fragmentary section showing the method of attaching the handle to the syrup pitcher.

The invention consists of a server substantially elliptical in form and having a top wall 10 and peripheral walls 11 which are imperforate to maintain the effect of depth to the server or dish.

The food or hot cake receiving recess or depression 12 is made equal in width to the diameter of an ordinary or conventional hot cake, about five inches, and the length twice as great with both ends consisting of half circles 13 and the sides 14 forming tangents providing a recess with semicylindrical ends joined by an intervening rectangular portion.

This recess nicely receives three hot cakes in linear overlapped relation and the depth of the recess is substantially equal to the thickness of a conventional hot cake, or slightly greater, and the sides 14 extend almost to the peripheral top edge 15 to form a very narrow rim 16 which is effective in presenting a completely filled dish.

The hot cakes 17, 18 and 19 when overlapped in linear relation, as shown present a more aesthetic, appetizing and generous display than when served on an ordinary plate.

The butter receptacle 20 fits in an aperture 21 formed in the top, and this aperture also serves as a passage for introducing ice or hot water into the receptacle below.

The syrup pitcher 22 is provided with a lip 23 and a handle 24 which consists of a lap member 25 which overlies the upper portion of the seam 26 of the pitcher body, continuing up and about to form the handle and continuing below the lower end of the handle to form a lap member for the lower portion of the seam, and thus completely conceals the seam.

The bottom 28 of the pitcher is spherically formed and terminates at its upper end in an annular shoulder 29 which rests on the top 10 while the spherical bottom fits in the opening 21. This pitcher cannot be set anywhere except in one of the openings 21 and therefore is dependent upon the server for its support.

A pan or container 30 having a bottom 31 and peripheral walls 32 fits within the server from beneath, and is removably secured therein by any known means, such as screws 33 passing through the handles 34, and is readily removed for cleaning or when the server is not to be used with temperature maintaining means such as hot or cold water.

The side walls 11 of the server are made at least three times as high as the depth of the recess 12 to provide the effect of depth to the recess, and they are made perpendicular to the top to increase the illusory effect of volume of food in the recess.

This dish is ideally adapted for cold plate lunches as also for hot or ordinary service, as the foods may be kept hot by introducing hot water or a hot brick or similar substance in the pan 30, and may be kept cold by placing crushed or dry ice in the container.

The pan is completely concealed and removable at will, and either hot or cold water or ice may be introduced through the openings 21, and the butter and syrup receptacles form stoppers for these openings.

It will be understood that variations in construction and arrangement of parts, which variations are consistent with the appended claims may be resorted to without detracting from the spirit or scope of the invention, or sacrificing any of the advantages thereof.

I claim:

1. A hot cake server comprising a frame consisting of perpendicular imperforate peripheral walls terminating at the upper end in a plane top wall of substantially elliptical form, a hot cake receiving depression formed in the top wall leaving a narrow margin of the top wall along the sides and having the form of two halves of a circle separated with intervening rectangular portion, whereby hot cakes may be served in linear overlapping relation to completely fill the depression throughout its length, and the narrow margin and spread serving of hot cakes and perpendicular peripheral walls terminating in the plane top wall provide an aesthetic display and the appearance of a very generous serving; a handle conforming to and secured to each end of said server, for adaptation of said server sequentially as a serving tray and a dish, a pan insertible in the underside of said server and coextensive with the interior thereof and completely concealable therein, releasable securing means for securing said pan therein, said pan serving as a temperature maintaining medium in connection with hot or cold water or ice, and an opening formed beyond each end of said depression and a flanged receptacle supported in each opening, said openings functioning selectively as filler openings for filling the pan, and receivers for said receptacles, and, said receptacles functioning simultaneously as covers for said openings and containers for food.

2. A hot cake server comprising a bottomless housing having perpendicular peripheral substantially imperforate walls terminating at the upper end in a plane top wall substantially elliptical in plan and having a shallow depression formed in the intermediate portion of the top wall and a circular opening formed in each end portion, leaving narrow margins of the top wall about the recess and openings, said recess having the form of two half circles connected through intervening rectangular portion to receive three hot cakes in linear overlapping relation to completely fill the recess throughout its length, depth, and width, and the narrow margins and spread serving providing the effect of a generous serving and an aesthetic display, and a pan insertible within said server from beneath and releasable securing means therefor, said pan being completely concealed therein for reception of hot water or other heating medium to keep the hot cakes hot, said openings serving selectively as filler openings, and, receivers for cups and pitchers.

3. In a bottomless serving dish having side walls terminating at the upper end in a plane top wall, a food receiving recess formed in the central portion of the top wall; a pan coextensive with the interior of the dish and insertible into said dish from beneath and completely concealable therein, securing means associated with said dish for securing said pan therein at will, and openings formed in said top wall in the end portions thereof and serving selectively as passages for introduction of crushed ice or hot water to said pan, and for support of receptacles having flanges to rest on the top wall.

4. In a bottomless serving dish having side walls and a top wall and food receptacles formed in the top wall; a pan insertible into said dish from beneath and securable therein and removable at will, and openings formed in said top wall serving selectively as passages for introduction of crushed ice or hot water to said pan, and for support of receptacles having flanges to rest on the top wall, said dish having a handle at each end, and a screw passing through each handle for cooperation with said pan and forming means for securing or releasing said pan in said dish at will.

5. A serving dish comprising a bottomless housing having perpendicular, peripheral, imperforate walls and a top wall substantially elliptical in form, a recess formed in said top wall and having a peripheral wall formed of two spaced apart complementary half circles tangentially connected and having a major diameter equal to twice its minor diameter, said peripheral walls of said housing having a height equal to not less than three times the depth of the recess to provide the illusory effect of volume to the recess, an opening formed through said top wall beyond the confines of said recess beyond each end, a butter receptacle in one opening, a syrup pitcher having a spherical bottom and annular supporting shoulder requiring its support in the other opening, a handle for each end of said dish, a pan mounted within said dish from beneath and releasable securing means therefor comprising fastening devices operating through said handles, said pan being removable and replaceable at will and completely concealable within said dish, said openings functioning selectively as passages for introduction of hot water or crushed ice, and as supports for, and sealed by said butter receptacle and pitcher.

KENNETH E. BEMIS.